United States Patent [19]

Rajan

[11] Patent Number: 4,538,281
[45] Date of Patent: Aug. 27, 1985

[54] ADAPTIVE ACQUISITION OF MULTIPLE ACCESS CODES

[75] Inventor: John A. Rajan, Hiawatha, Iowa

[73] Assignee: Rockwell International Corporation, El Segundo, Calif.

[21] Appl. No.: 375,624

[22] Filed: May 6, 1982

[51] Int. Cl.³ .............................................. H04K 1/04
[52] U.S. Cl. .......................................... 375/2.2; 375/1
[58] Field of Search ............................ 375/1, 2.1, 2.2; 343/17.2 PC; 455/25; 179/2 EB

[56] References Cited

U.S. PATENT DOCUMENTS

| | | | |
|---|---|---|---|
| 4,121,159 | 10/1978 | Lampert | 375/1 |
| 4,122,393 | 10/1978 | Gurdy et al. | 375/1 |
| 4,134,071 | 6/1979 | Ohnsorge | 375/2.2 |
| 4,152,651 | 5/1979 | Lampert et al. | 375/1 |
| 4,180,708 | 12/1979 | Yamaguchi et al. | 179/2 EB |
| 4,241,312 | 12/1980 | Barnes et al. | 375/1 |
| 4,291,409 | 9/1981 | Weinberg et al. | 375/1 |
| 4,302,817 | 11/1981 | Labedz | 455/35 |
| 4,327,438 | 4/1982 | Baier et al. | 375/1 |
| 4,383,323 | 5/1983 | Timor | 375/2.2 |
| 4,400,790 | 8/1983 | Chamber et al. | 375/1 |
| 4,423,517 | 12/1983 | Danno et al. | 375/1 |
| 4,443,661 | 4/1984 | Kubo | 179/2 EB |
| 4,455,651 | 6/1984 | Baran | 375/1 |

Primary Examiner—Salvatore Cangialosi
Attorney, Agent, or Firm—George A. Montanye; H. Fredrick Hamann

[57] ABSTRACT

An adaptive acquisition technique is disclosed for enabling the initial acquisition of a received coded signal in a direct sequence spread spectrum system using multiple access codes for code division multiplexing. In order to obtain code synchronization by initial acquisition, correlation of a received code with a reference code is performed by an adaptive serial search over the code phase uncertainty which compares the measured signal correlation levels with two thresholds fixed to have a constant difference. During code signal acquisition, the thresholds are increased each time the measured correlation level exceeds the upper threshold, by an amount which equals the difference between the correlation level and the current upper threshold. Initial code signal acquisition is indicated when the detected correlation level raises the threshold levels to a point after which no further correlation measurements exceed the lower threshold. In this manner, false code signal synchronizations normally caused by autocorrelation sidelobes during strong signal reception, are reduced with little degradation in the low signal performance of the system.

18 Claims, 6 Drawing Figures

ADAPTIVE ACQUISITION OF MULTIPLE ACCESS CODES

The Government has rights in this invention pursuant to contract No. F04701-79C-0083 awarded by the Department of the Air Force.

BACKGROUND OF THE INVENTION

The present invention relates to spread spectrum signal transmission and acquisition techniques and more particularly to an adaptive acquisition technique for enabling improved code signal acquisition in multiple access code systems using code division multiplexing.

In communication systems, a group of modulation techniques has been developed which produce what is known in the prior art as spread spectrum systems. Spread spectrum techniques are generally well known and are specifically characterized by their use of large bandwidths to send small amounts of information. While there are a variety of spread spectrum techniques, all have two characteristics in common: (1) the transmitted bandwidth is much greater than the bandwidth of the information being sent; and (2) some function other than the information being transmitted is used to determine the bandwidth of the transmitted signal.

Typically, while more complex than conventionally modulated communication systems, spread spectrum systems offer several advantages that other systems do not. By way of example, a spread spectrum system can be used to selectively transmit to designated receivers within a communication system. In such instances, each of a plurality of receivers in the system are assigned a different code. A transmitter then selectively contacts any of the individual receivers by modulating the transmitted signal with the same code as that assigned to the particular receiver. The receiver in turn matches its reference code in phase with the transmitted code to allow demodulation of the transmitted information. In this manner, information can be transmitted to a given receiver while preventing that transmission to other receivers in the communication system.

Spread spectrum systems also allow code division multiplexing wherein a plurality of multiple access codes are used to enable a plurality of transmitters and receivers to operate on the same frequency. In this example, a plurality of transmitters are each assigned a different code which is used to modulate the same carrier frequency. Each of the receivers in the system may then select the transmitter from which information will be received by selecting the receiver reference code to be a replica of the code of the selected transmitter and synchronizing the reference code with the code received from the transmitter. In this manner, each of the receivers in the system may selectively listen to one particular transmitter of the plurality of transmitters in the system.

One such common spread spectrum technique is normally referred to as direct sequence modulation. In direct sequence systems, the signal transmission will give rise to crosscorrelation of the received signal when plural transmitters simultaneously transmit with different codes on the same carrier frequency. Likewise, during receipt and acquisition of a transmitted signal at a receiver, autocorrelation of the transmitted signal and receiver reference signal will produce unwanted autocorrelation sidelobes. The effect of any high degree of correlation between simultaneously transmitted codes and the receiver reference, is to increase the false alarm rate of the receiver (the number of false indications of transmitter and receiver reference code phase synchronizations).

In an effort to overcome the above spurious signal correlation, the codes are usually selected to minimize the crosscorrelation levels and the autocorrelation sidelobes. One such code selection procedure was developed by Gold and is referenced in the article entitled "Optical Binary Sequences for Spread Spectrum Multiplexing" in the *I.E.E.E. Transactions on Information Theory*, Volume IT-13, pages 619–621, dated October, 1967. Using the codes developed by Gold and others, the autocorrelation sidelobes and crosscorrelation levels are reduced significantly below the primary autocorrelation peak which represents the phase synchronization of the reference code with the transmitted code. Code signal acquisition is then obtained by comparing the correlation level of the received and local reference code with a threshold which isolates the primary autocorrelation peak from the crosscorrelation levels and largest autocorrelation sidelobes.

While such code selection techniques have improved signal acquisition, the same still result in a high number of false alarms in systems designed to operate over wide ranges in received signal power. Specifically, at high signal levels, there is a greater likelihood that one of the autocorrelation sidelobes, which is normally well below the primary autocorrelation peak, will exceed the set threshold and produce a false alarm or improper code signal acquisition. While the problem may be overcome by measuring correlation over the entire code phase uncertainty and determining at which point the correlation level is at a maximum, this requires a significant increase in detection time and thus increased receiver acquisition time. Receiver acquisition time will be even further increased when the code sequences are large. The technique is therefore not suitable for systems requiring fast acquisitions.

Other attempts to reduce false alarms at high signal levels have employed higher thresholds or sidelobe cancellation techniques such as that described in the article "Pseudorandom Code Sidelobe Canceller", *International Telemetering Conference Proceedings*, pp. 349–363, 1977. Again, such techniques are unacceptable since higher thresholds only improve strong signal performance at the expense of a substantial and unacceptable decrease in weak signal performance. Likewise, sidelobe cancellation techniques only provide a limited improvement in the strong signal performance. There is therefore a continuing and substantial need for systems and techniques which enable the detection and acquisition of the coded signal in multiple access communication systems using code division multiplexing which will improve strong signal performance without significant degrading of the weak signal performance.

Accordingly, the present invention has been developed to overcome the above known and similar shortcomings and to provide an adaptive acquisition technique which improves code signal acquisition in direct sequence spread spectrum systems.

SUMMARY OF THE INVENTION

In accordance with the present invention, an adaptive acquisition system and technique enables improved code signal acquisition in a direct sequence spread spectrum system using multiple access codes. Each of a plurality of transmitters in a spread spectrum system are constructed to transmit information on the same carrier frequency but with different modulation codes. Each of the receivers is configured to generate a local reference code which is to be correlated (phase matched) with the received signal code of the transmitter from which reception is desired. The measured correlation between the received and reference codes are serially searched and compared with two thresholds fixed to have a constant value of separation. During correlation measurement, the thresholds are adapted each time the measured correlation level exceeds the upper threshold. At that time, both thresholds are raised by an amount equal to the difference between the measured correlation level and the value of the most recent upper threshold. During the search, increased measurements of correlation from autocorrelation sidelobes will raise the thresholds until the primary autocorrelation peak (indicating the proper phase for code signal acquisition) causes the lower threshold to be raised above the level of all other autocorrelation sidelobes. At that time, code signal acquisition is indicated and the information may be demodulated by the receiver. This adaptive technique causes a substantial improvement in strong signal code acquisition performance with minimal effect on the low signal performance of the system.

It is therefore a feature of the invention to provide an improved apparatus and technique for signal acquisition in a spread spectrum system.

Yet a further feature of the invention is to provide a spread spectrum system having improved strong signal performance.

It is a further feature of the invention to provide an adaptive acquisition apparatus and technique for allowing improved code signal acquisition in a multiple access spread spectrum system using code division multiplexing.

Another feature of the invention is to provide an adaptive serial search apparatus and technique for code acquisition which enables improved strong signal performance without increasing acquisition times.

Still another feature of the invention is to provide a dual threshold adaptive acquisition apparatus and technique for initial code acquisition in a multiple access spread spectrum system.

Yet another feature of the invention is to provide a serial search code acquisition apparatus and technique using dual thresholds for differentiating between the primary autocorrelation peak and autocorrelation sidelobes in a spread spectrum system.

A still further feature of the invention is to provide a multiple access, code division multiplexed, spread spectrum system which employs a dual threshold adaptive acquisition search technique for code signal acquisition.

These and other advantages and novel features of the invention will become apparent from the following detailed description when considered with the accompanying drawings wherein:

DETAILED DESCRIPTION OF A PREFERRED EMBODIMENT

Figure 1:
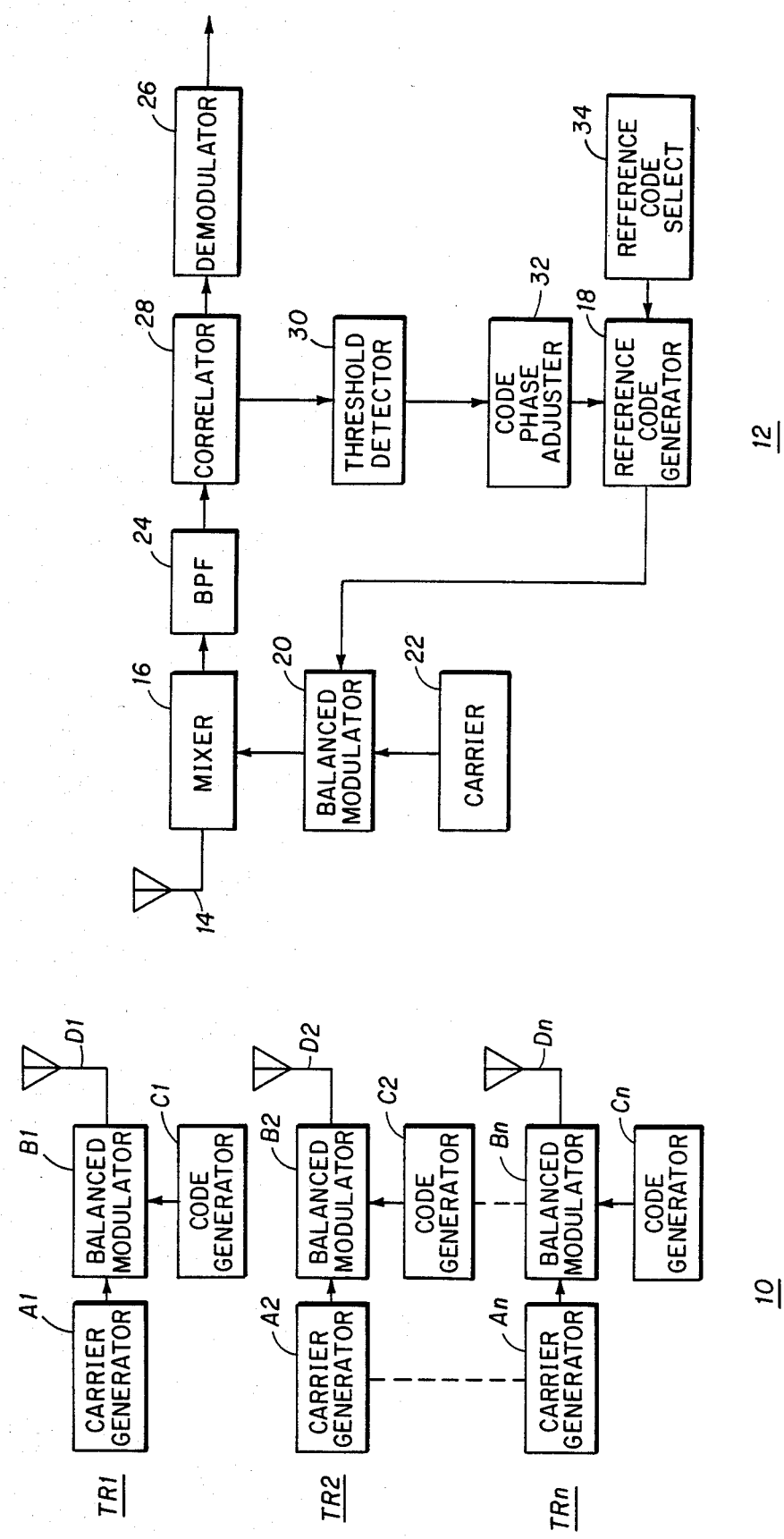
FIG. 1 is a schematic diagram showing a typical direct sequence spread spectrum system of the prior art.

Referring now to the drawings, like numerals are used to depict like elements throughout. In FIG. 1, there is shown a schematic diagram of a typical direct sequence spread spectrum system known in the prior art. The system includes a transmitting portion 10 and a receiving portion 12. The transmitting portion 10 includes a plurality of transmitters TR1, TR2 . . . TRn. Each transmitter includes a plurality of oscillators A1, A2 . . . An, each of which generate and provide a carrier frequency as input to an associated balanced modulator B1, B2 . . . Bn. Code generators C1, C2 . . . Cn, which are designed to increase the bandwidth of the transmitted signal, are coupled as a second input to the associated balanced modulators B1–Bn, and combined with the respective carrier from A1–An to produce a spread spectrum signal to be transmitted by associated antennas D1, D2 . . . Dn. Information which is to be transmitted may be impressed on the carrier frequencies generated by A1–An by any suitable technique or may be incorporated as part of the code generated by elements C1–Cn and combined through the respective balanced modulators B1–Bn prior to transmission. The carrier generators A1–An, code generators C1–Cn, and balanced modulators B1–Bn are well known elements conventionally coupled to expand narrow band frequency information by use of code generators C1–Cn to produce spread spectrum transmission at antennas D1–Dn.

The receiving portion 12 of the spread spectrum system includes a receiving antenna 14 which couples the transmitted signals from 10 as one input to a mixer 16. At the same time, a reference code generator 18 generates a local reference code selected to match one of the codes from code generators C1–Cn. The output of reference code generator 18 is coupled as a first input to a conventional balanced modulator 20. A second input to the balanced modulator 20 is provided by a carrier generator 22 which generates a replica of the carrier frequency generated by the generators A1–An associated with the selected code. The output of the balanced modulator 20 is provided as a second input to mixer 16 to provide recovery of the carrier and information contained in the carrier from one of the plural transmitters in portion 10.

The output of the mixer 16 is coupled through a bandpass filter 24 designed to filter the transmission through a specific frequency range to isolate the transmitted signal from other undesired and spurious signals. The output from the bandpass filter 24 is coupled through a correlator 28 to a demodulator 26 for recovering the information contained in a signal transmitted from one of the transmitters in portion 10. Again, the elements 16, 18, 20, 22, 24, 26 and 28, and their operation are conventional and no further detail is needed for an understanding of the present invention.

While the above system is described with respect to only one receiver in the receiving portion 12, typical code division multiplexing systems may include a plurality of identical receivers, each of which may generate a reference code which is a replica of that generated by the code generators C1–Cn of the plurality of transmitters. Information may then be received from any transmitter by any receiver simply by matching the phase of the reference code from code generator 18 to that of a selected code generator C1–Cn to enable demodulation of the encoded signal.

Since the operation of a typical direct sequence spread spectrum system is well known, it will not be described in great detail herein. Generally, however, such systems employ reference code selection and phase detection circuitry capable of matching the reference code to the transmitted code so that the proper demodulation of the transmitted signal can be obtained. The normal process for accomplishing the detection necessary to match the phases of the reference and transmitted code includes a correlator 28, a threshold detector 30, and a code phase adjuster 32 coupled as shown in FIG. 1.

In operation, the code to be generated by reference code generator 18 is selected by reference code selector 34. Selector 34 may be any conventional circuitry capable of causing reference code generator 18 to reproduce an exact replica of the code generated by one of the code generators C1–Cn depending upon which transmitter from portion 10 the receiver 12 selected to receive. After the reference code has been selected, and the received spread spectrum signal down-converted to baseband by code and carrier demodulation by elements 16, 18, 20 and 22, a technique must be used to match the phase of the reference code generated by element 18 to that of the code generated by the selected transmitter. This matching process is known as initial acquisition and is the technique by which the spread spectrum receiver synchronizes its locally generated code phase to that of the phase of the received code.

Basically, a simple serial code search is performed which employs the threshold detector 30 to signify initial synchronization. In operation, correlator 28 measures the correlation between the received code signal and the reference code signal at a plurality of points over the code phase uncertainty and compares the measured correlation signal with a predetermined threshold signal. When a measured correlation level exceeds the magnitude of that predetermined threshold signal in threshold detector 30, a phase match is indicated and coupled through code phase adjuster 32 to fix the phase of the reference code generator at that providing maximum correlation of the received and reference code signals. Correlator 28, threshold detector 30 and code phase adjuster 32 are also conventional elements and thus need no further detailed description for an understanding of the invention. Nevertheless, code phase adjuster 32 normally operates to provide a phase adjustment to the reference code generator at predetermined intervals. When a signal is received from threshold detector 30, the adjuster 32 stops changing the code phase and thereby locks the reference code generator 18 at that phase which provides the maximum correlation at the output of correlator 28.

As was noted, the correlator 28 may be any of a variety of conventional detectors designed to provide a correlation detection technique capable of matching the received and reference code signals. In the present example, the correlation detection technique is a simple non-coherent Swerling target detection technique such as that described in the article entitled "Studies of Target Detection by Pulsed Radar", *I.R.E. Transactions on Informational Theory*, Volume IT-6, pp. 59–267, dated April, 1960. While the details of such a detection technique are described in the aforementioned article, the detection technique generally employs predetection filtering, square law detection and post-detection filtering on the in-phase (I) and quadrature (Q) channels in a manner shown in FIG. 4 as will be subsequently described. As was previously mentioned, however, when a plurality of transmitters are used in the system, crosscorrelation levels and autocorrelation sidelobes may produce correlation in the receiver which causes false correlation peaks so that the measured correlation output from correlator 28 exceeds the threshold set in threshold detector 30 at other than the proper phase, thereby causing false signal acquisition and prohibiting demodulation and extraction of the transmitted information.

In an attempt to overcome the problems caused by significant crosscorrelation levels and major autocorrelation sidelobes, the previously mentioned techniques of Gold and others (using a family of codes having low crosscorrelation levels and low autocorrelation sidelobes) have been employed. While such techniques have reduced the problems caused by crosscorrelation levels and autocorrelation sidelobes, the sidelobes are still sufficiently large that when a received signal is strong, it is possible that an autocorrelation sidelobe will exceed the minimum detectible signal of the fixed threshold acquisition detector 30. The reasons for this will be easily understood by referring to the following brief description of a typical single threshold serial search acquisition technique.

Figure 2:
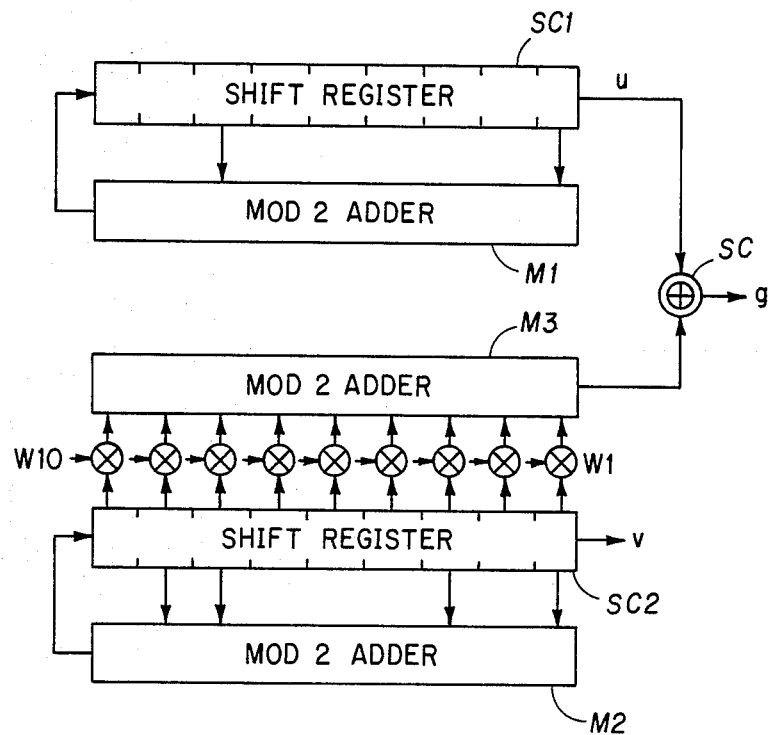
FIG. 2 is a schematic diagram showing a representative code generator of the prior art.

First, assume that the direct sequence spread spectrum code division multiple access system of FIG. 1 employs a family of Gold-codes generated by the conventional circuit shown in FIG. 2 from two primitive polynomials:

$$P_1(X) = X^{10} + X^3 + 1$$

$$P_2(X) = X^{10} + X^8 + X^3 + X^2 + 1$$

Then let $\alpha$ be a root of $P_1(X)$ such that $\alpha^5$ is a root of $P_2(X)$. Also let u be the sequence generated by $P_1(X)$ and v be that generated by $P_2(X)$. The members, $G(u,v)$ of the Gold code family generated by u and v are:

$$G(u,v) = [u, v, G'(u,v)] \text{ where}$$

$$G'(u,v) = [u + T^k v: K=0,1,2 \ldots (N-1)] \text{ and}$$

$$N = 2^{10} - 1$$

Given that T is a vector operator which performs one cyclic left-shift, note that $G(u,v)$ contains $N+2$ sequences of period N. The magnitude of the autocorrelation sidelobes and the magnitude of the crosscorrelation peaks of any two members of $G(u,v)$ are less than or equal to 65.

Using the typical Gold-code generator of FIG. 2, a member, g, of the Gold-code $G(u,v)$ can be generated. As shown in FIG. 2, the Gold-code generator includes two shift registers, SR1 and SR2 having outputs coupled to their respective Modulo-2 adders M1 and M2 with the outputs of M1 and M2 coupled respectively as input to shift registers SR1 and SR2. Outputs of shift register SR2 are coupled through associated multipliers and thence to a Modulo-2 adder M3. The output from Modulo-2 adder M3 and the u output of SR1 is coupled to a EXCLUSIVE-OR summing circuit SC to provide an output g. The output v is taken from shift register SR2.

The generator of FIG. 2 is conventionally operated to produce the family of Gold-codes to be used in the spread spectrum system. Any shift $T^k$ in v can be obtained by choosing appropriate weights W1, W2 . . . W10 for the outputs on shift register SR2. Assuming a code clock rate of 1.023 MHz, the code G(u,v) repeats every 1 ms. If the data bit rate for the selected spread spectrum system under consideration is 50 Hz, then at the transmitter, a member, g, of the Gold-code family is EXCLUSIVE-OR-ed with the 50 Hz data and the resulting binary sequence is used to biphase modulate an L-band carrier in a known manner in accordance with FIG. 1. At the receiver, the locally generated replica of the transmitted code is synchronized to the received code so that data demodulation can be made.

In the prior art serial acquisition technique, the received spread spectrum signal is down-converted to baseband by code and carrier demodulation as shown in FIG. 1. In the serial acquisition process, correlation detection measurements are then performed at one-half chip intervals or less over the code phase uncertainty (where a chip refers to the period of the clock pulse used to drive the code generating shift register). The correlation measurement or detection tests are performed in baseband using digital matched filtering for various reference code phases over the code phase uncertainty. During acquisition, the carrier phase is generally unknown, and hence quadrature carrier demodulation is used. Thus, the baseband signal is contained in both I and Q channels and is detected as in FIG. 4.

Figure 4:
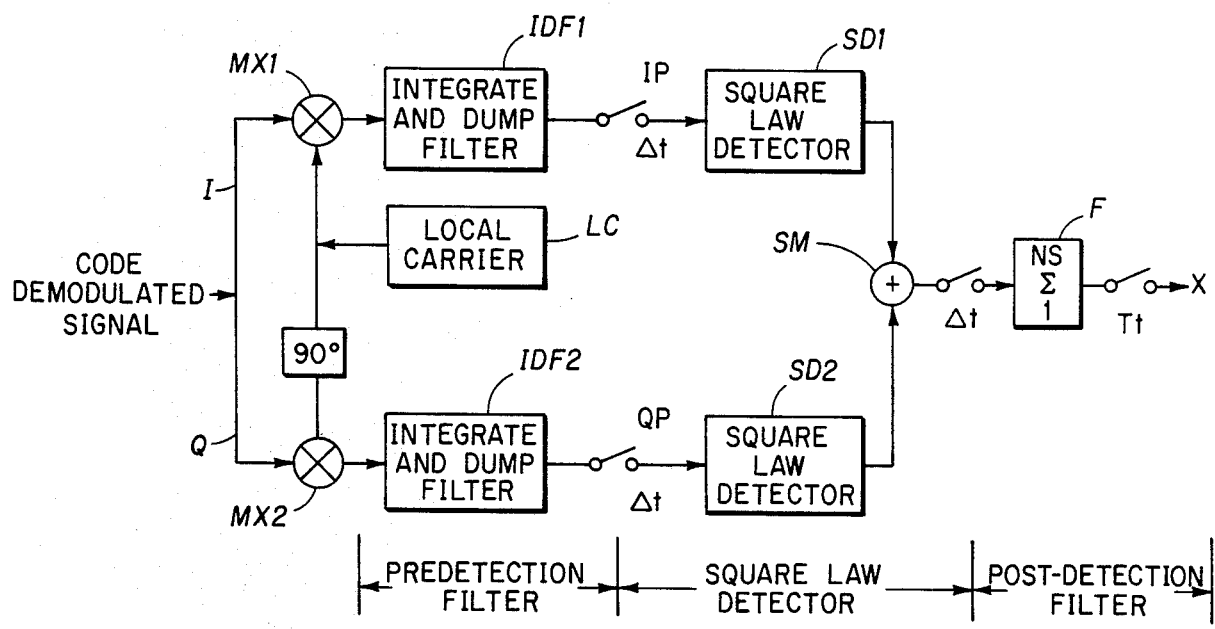
FIG. 4 is a schematic diagram showing a prior art configuration for providing signal correlation measurement for use in connection with the circuit of FIG. 3.

For the system under consideration, a correlation detection technique with a test time, $T_t$, is employed using the non-coherent Swerling target detection technique of FIG. 4. As shown, the code demodulated signal is received as input to two mixers MX1 and MX2. A local carrier, LC, provides input to the I channel through MX1 and a 90° phase-shifted input to the Q channel through MX2. The output of MX1 and MX2 is taken through conventional integrate-and-dump filters IDF1 and IDF2. The outputs from the IDF1 and IDF2 are provided to square-law detectors SD1 and SD2, respectively and added through a summing circuit SM and thence provided as output to post-detection filter F.

The test time $T_t$ is given by $$T_t = \Delta t \, N_s$$

where $\Delta t$ is the integration time of the predetection filters performed by the integrate-and-dump filters IDF1 and IDF2, and $N_s$ is the number of square-law detected samples accumulated by the digital post-detection filter F from the square law detectors SD1 and SD2. The switches adjacent the indications of $\Delta t$ in the drawings are used to depict the switching action performed by the integrate-and-dump filters IDF1 and IDF2.

Assume for this example that $\Delta t$ is 1 ms and $N_s$ is 20. The false alarm probability per test position (measured correlation), $P_{fa}$, required to achieve a probability of acquisition of $P_d$ in one search through the code/carrier uncertainty is $$P_{fa} = (1 - P_d)/N_{max}$$

where $N_{max}$ is the maximum number of tests to be carried out in the worst case. The expression for $P_{fa}$ assumes that the power in spurious correlations is negligible and the primary correlation peak is detectable. If it is assumed for purposes of simplicity that the uncertainty in an L-band carrier is within 3 dB predetection bandwidth so that the carrier uncertainty does not call for multiple frequency scans, then for the worst case code uncertainty, only one period of the code has to be tested at one-half chip intervals thereby leading to an $N_{max}$ of 2046. Assuming a $P_d$ of 0.98, the $P_{fa}$ will be $10^{-5}$. A normalized threshold $V_N$ for the correlation test is a function of $P_{fa}$ and $N_s$. The normalized threshold $V_N$ and the performance of the detection scheme for various carrier-to-noise ratios ($C/N_O$) can be found using Marcum Q functions as described in the I.R.E. article previously mentioned. The value for the normalized threshold $V_N$ for the described chosen correlation test is 45.1. The actual threshold $V_A$ is related to the normalized threshold $V_N$ by $$V_A = 2\sigma^2 V_N$$

where $\sigma^2$ is the variance of the output samples from integrate-and-dump filters IDF1 and IDF2. $\sigma^2$ is periodically measured for use in setting the acquisition threshold in the described and known manner. The measured correlation level X, as tested by the circuit of FIG. 4, is then compared with the actual threshold $V_A$. If X is less than $V_A$, no signal is detected at that reference code test phase and measurement of the correlation level will be continued at the next test phase. If X is greater than or equal to $V_A$, transmitted signal code presence is declared and code/carrier tracking is attempted at that test phase.

During code search, the signal X produced by the correlation test (measurement) is a function of the autocorrelation of the Gold-code corresponding to the relative phase between the local reference code and the received code. This signal is maximum when the two codes are in synchronization (autocorrelation peak). At high carrier-to-noise ratios, however, the autocorrelation sidelobes have sufficient power to exceed the single fixed threshold and indicate an erroneous phase synchronization or signal acquisition. For multiple autocorrelation sidelobes, a receiver may acquire and indicate false signal acquisition on almost any or all false correlation peaks thereby preventing fast and accurate code synchronization/acquisition and preventing proper receipt and demodulation of the transmitted signal.

Figure 5:
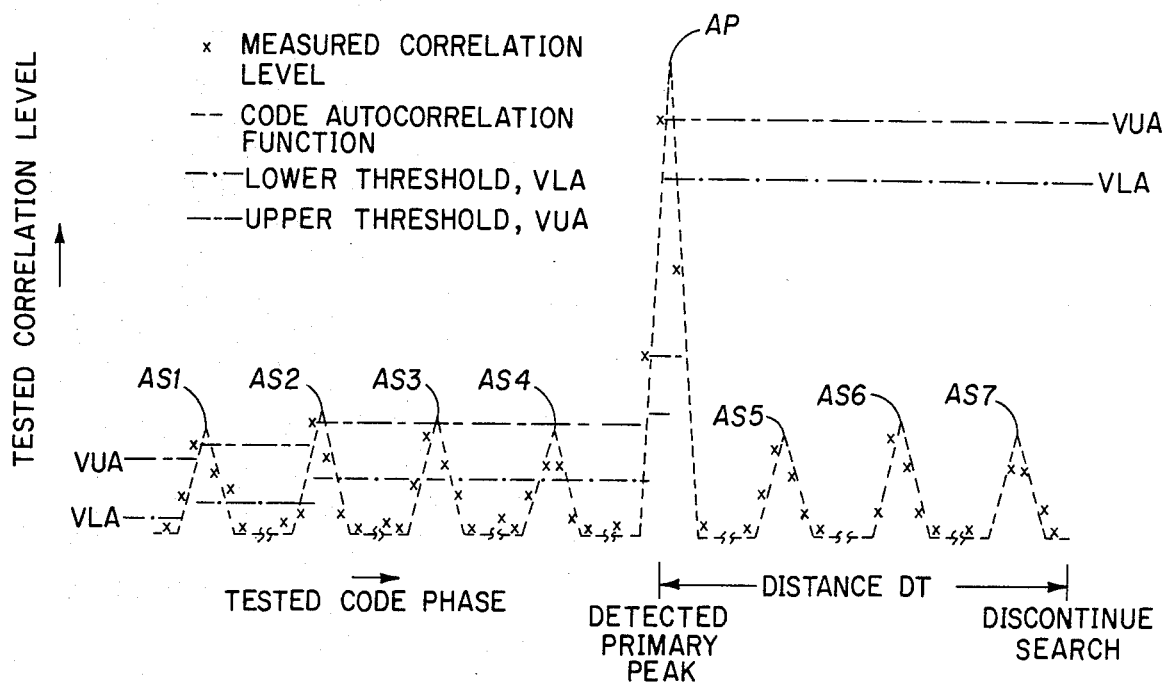
FIG. 5 is a schematic diagram showing the threshold variation in connection with the adaptive acquisition technique of the present invention.

In the reference example, the primary autocorrelation peak for the chosen G'(u,v) had a magnitude of 1023 and the sidelobes had magnitudes of $-1$, 63, and $-65$. The sidelobes are 60.2, 23.94 and 24.91 dB below the primary autocorrelation. The $-23.94$ and $-24.91$ dB correlations are referred to as spurious correlations, having sufficient levels such that for high carrier-to-noise signals, false acquisition is likely. In FIG. 5, although not drawn to scale or to the particular selected example, an illustrated view of the primary and autocorrelation sidelobes of a signal spectrum is given. The autocorrelation peak AP is shown along with the autocorrelation sidelobes AS1-AS7. As can be seen, if various correlation measurements X are made over the code phase uncertainty, the signal level will be determined by the code autocorrelation as a function of the synchronization error. The autocorrelation peak AP will naturally give the largest signal, but if the carrier-to-noise ratio is large, almost any of the significant sidelobes can cause a fixed single threshold to be exceeded. Using a Monte Carlo simulation for a single fixed threshold serial acquisition technique, the probability of signal acquisition for different levels of carrier-to-noise ratio is shown as the solid line in FIG. 6. In this case, the initial correlation measurement X was chosen at random and subsequent tests for X were carried out at one-half chip intervals, A code, with the sum of the spectra at 63 and −65 being minimum, corresponds to the best case for the prior art fixed threshold serial search acqustion. One such code was used for the Monte Carlo simulation. As can be seen, the probability of acquisition at first significantly increases, levels off, and then significantly decreases as the carrier-to-noise ratio continues to increase.

Figure 3:
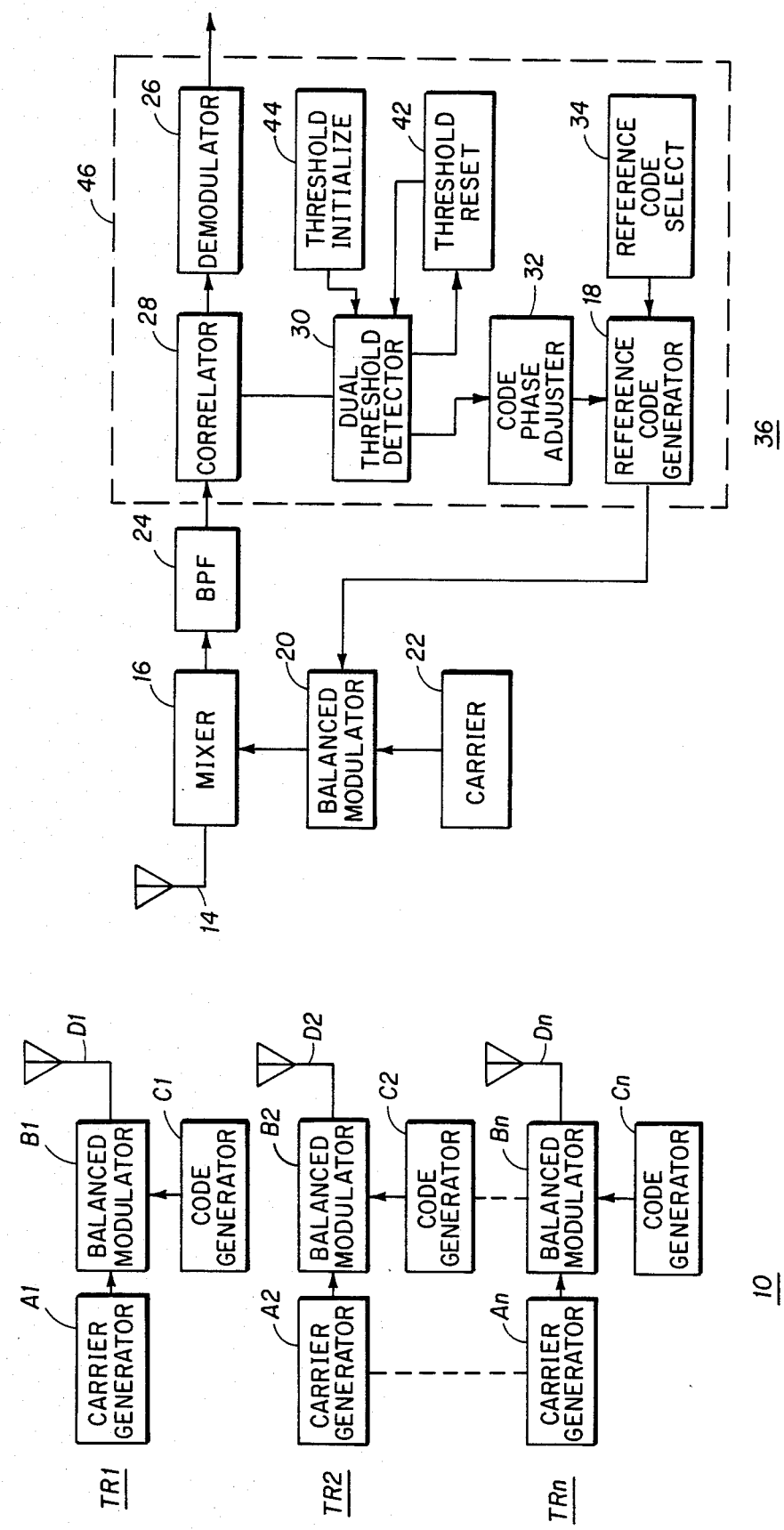
FIG. 3 is a schematic diagram showing a direct sequence spread spectrum system using code division multiplexing for multiple access in accordance with the present invention.

In order to overcome the above deficiencies in strong signal performance with only minimal degradation of the small signal performance and without having to search the entire code phase uncertainty, the present invention employs a dual variable threshold serial acquisition technique. Referring first to FIG. 3, there is shown a schematic diagram of the multiple access code division multiplexed direct sequence spread spectrum system. Similar to FIG. 1, the system includes a plurality of transmitters TR1, TR2 ... TRn including a plurality of carrier generators A1, A2 ... An which generate a carrier frequency and deliver that carrier frequency to a respective balanced modulator B1, B2 ... Bn. The balanced modulator also receives a code input from its respective code generator C1, C2 ... Cn wherein each of the code generators generates a different code for increasing the bandwidth of the transmitted signal. Either the carrier or the code may be used to impress the information which is desired to be transmitted and the output from the balanced modulators B1-Bn are then delivered to their respective transmitting antennas D1-Dn. Each of the carrier generators A1-An may generate the same carriers with different codes or different carriers so long as the receiver is capable of matching code and carrier frequencies. In the present example, the operation of the system will be described on the assumption that all carrier generators A1-An are generating the same carrier and the code generators C1-Cn are generating different codes.

The receiving portion 36 of the system includes a receiving antenna 14 which delivers the signals from transmitting antennas D1-Dn to mixer 16. At the same time, reference code generator 18 provides a local reference code as input to the balanced modulator 20 along with a signal from the carrier generator 22. The output of the balanced modulator 20 is then provided to mixer 16 to provide a baseband demodulated code and signal to the IF bandpass filter 24. Again, the output of 24 is provided through correlator 28 and demodulator 26 to obtain the transmitted information once the code reference is phase-synchronized with the selected transmitted code. As in FIG. 1 the reference code select 34 selects the local reference code which is to be generated in order to match one of the transmitted codes C1-Cn.

In contrast to the prior art system of FIG. 1, the proposed adaptive acquisition technique employs thresholds which are adapted to the power in the major autocorrelation sidelobes. The measurement (sampling or testing) of the correlation level is performed in the same manner as in the fixed threshold acquisition technique of FIG. 1, using the conventional non-coherent correlation detection technique illustrated in FIG. 4. In the inventive technique, however, rather than making a serial search over the code phase uncertainty and using a single threshold signal to provide primary peak detection, two threshold signals are employed, one forming an upper threshold $V_{UA}$ and the other a lower threshold $V_{LA}$. The initial values of the thresholds are derived from preselected normalized thresholds $V_{UN}$ and $V_{LN}$ as will be more particularly described.

In operation, dual threshold detector 40 in FIG. 3 initially receives a signal from threshold initializing circuit 44 which sets the initial thresholds $V_{UA}$ and $V_{LA}$. The correlation output from 28 is transmitted to the dual threshold detector 40 where it is compared with the two thresholds $V_{UA}$ and $V_{LA}$. As the measurements of correlation X are made, the two thresholds are raised if the measured correlation output from 28 exceeds the upper threshold. The amount by which the two are raised is the difference D between the correlator 28 output and the upper threshold $V_{UA}$. This difference, $D = X - V_{UA}$ is calculated in the threshold reset circuit 42 and is used to modify the upper and lower thresholds $V_{UA}$ and $V_{LA}$ in detector 40 before the next successive output X from correlator 28. $V_{UA}$ and $V_{LA}$ may change from one test position to the next successive test position depending on the difference D but the difference between $V_{UA}$ and $V_{LA}$, referred to as the threshold margin TM, is controlled to remain the same. The output from the dual threshold detector 40 is then coupled through phase adjuster 43 to reference code generator 18 so that the phase of the reference code generator tracks at that phase determined to signify a match between the transmitted and reference code phases.

A more detailed description of the adaptive search technique will now be described with reference to FIGS. 3-5. Again, a typical section of the autocorrelation function of a transmitted Gold-code and the corresponding measured correlation test levels X are shown in FIG. 5. The adaptive acquisition technique performs a serial search with adaptive thresholds starting at an arbitrary position during the code phase uncertainty. If the tested correlation level X is less than $V_{LA}$, as shown in FIG. 5, then there is no signal detected by threshold detector 40 and testing is continued at the next successive test phase. If the correlation level X is greater than or equal to $V_{LA}$, then a signal due to spurious or primary correlation is detected by detector 40 at that test phase. At this point, the test phase corresponding to the detected signal is stored in adjuster 43 and the testing is continued to the next successive test phase, but no change is made to $V_{UA}$ or $V_{LA}$, by reset 42. If the measured correlation level X exceeds the upper threshol $V_{UA}$, both thresholds $V_{UA}$ and $V_{LA}$ are raised by an amount $X - V_{UA}$ by reset 42 (keeping TM constant). This test phase is likewise detected and stored by adjuster 43 and testing is again continued to the next test phase. If the current test phase (in chips) is more than a predetermined distance DT from the phase position of the last detected signal, then testing is discontinued and code/carrier tracking is attempted under the control of adjuster 43 at the test phase corresponding to the last detected signal.

The distance DT is chosen such that if the test phase corresponding to the primary correlation has not yet been tested, then there is a high probability that at least one spurious correlation found inside length DT will exceed threshol $V_{LA}$, for any code in G'(u,v). If it is assumed that a search of a section of the code phase has been made that does not contain a primary peak (where the received signal is strong) then the adaptive threshold would have adapted such that the upper threshold $V_{UA}$ is equal to the maximum correlation test measurement tested to that point. So long as the threshold margin TM is properly chosen, it can be insured that almost all spurious correlations will exceed $V_{LA}$. Consequently, when the test at the code phase corresponding to the primary correlation is performed, both the thresholds will be raised far above the correlation levels corresponding to subsequent spurious correlations. Thus, the tested correlation levels corresponding to spurious correlations, produced by autocorrelation sidelobes following the primary correlations, will not exceed $V_{LA}$. In the present example, the code phase adjuster 43 may be any conventional circuitry which can store a signal indicating a possible code phase match, allow testing at other code phases, and, after a time DT from the last stored signal, synchronize the code at the code phase indicated as the match.

As was previously noted, the adaptive acquisition technique is more specifically shown in FIG. 5. As can be seen, the tested correlation level X is made over the code phase uncertainty and produces correlation levels at the various autocorrelation sidelobes AS1–AS7. Among those autocorrelation sidelobes is also the autocorrelation peak AP. During testing, the thresholds $V_{UA}$ and $V_{LA}$ are initially set by circuit 44 and the correlation levels tested at the test points as the code phase of the reference code generator is changed by adjuster 43. Each time that the tested correlation level X falls below $V_{LA}$, the receiver continues testing and the dual thresholds $V_{UA}$ and $V_{LA}$ remain unchanged. When the tested correlation level X falls between $V_{LA}$ an $V_{UA}$, that phase position is stored in adjuster 43 as a possible correlation peak, but again the threshold levels $V_{LA}$ and $V_{UA}$ remain unchanged. When the tested correlation level X exceeds the upper threshold $V_{UA}$, (as depicted during testing of the correlation level on autocorrelation sidelobes AS1 and AS2), the thresholds $V_{LA}$ and $V_{UA}$ are raised by the difference $D = X - V_{UA}$. Again, the test is continued and the thresholds raised each time an autocorrelation sidelobe produces a tested correlation level X exceeding the upper threshold $V_{UA}$.

When the tested code phase reaches a point corresponding to a primary autocorrelation peak, the tested correlation level X increases significantly above the autocorrelation sidelobes AS1 through AS4, and as seen in FIG. 5, the threshold levels $V_{UA}$ and $V_{LA}$ are also raised in accordance with the increase in the correlation level. At this time, the thresholds $V_{UA}$ and $V_{LA}$ are raised to the point that subsequent autocorrelation sidelobes AS5, AS6 and AS7 are not capable of providing tested correlation levels X which exceed $V_{LA}$ and provide false indications of phase-synchronization. After a predetermined distance DT from the detected primary peak AP, the search is discontinued and acquisition is made at the tested phase corresponding to the last measured correlation level where $X \geq V_{LA}$. Again, the distance DT is chosen such that if the test phase corresponding to the primary correlation has not yet been tested, then there is a high probability that at least one spurious correlation found inside length DT will exceed the lower threshol $V_{LA}$ for any code in G'(u,v), thereby allowing the adaptive acquisition to acquire any code in G'(u,v).

As will be apparent, the performance of the system depends on the proper selection of $V_{UA}$, $V_{LA}$, the threshold margin TM, and the distance DT over which the code phase is tested. These values are chosen on the basis of experimental measurements with respect to a chosen G'(u,v). Considering a member $g'_k = (u + T^k v)$ of the family G'(u,v), and letting L be the distance in chips between adjacent autocorrelation peaks (spurious or primary) and letting $L_m(k)$ be the maximum value of L for $g'_k$, then any section of length $L_m(k)$ of the autocorrelation function $g'_k$ will contain at least one primary or spurious autocorrelation peak. Experimental results have shown that $L_m(K)$ varies from 10 to 63 depending on k. Letting $$L_{G'} \max[(L_m(k), k=0,1,\ldots 1022)]$$

then any section of length $L_{G'}$ of any code in G'(u,v) will contain at least one spurious correlation. For the selected four level Gold code G'(u,v) of the present example, $L_{G'} = 63$. Experimental results show that the minimum section length required to ensure two spurious correlations varies from 15 to 71 and, to ensure three spurious correlations, varies from 19 to 83, in each case the length depending on k. Simulation results for the proposed acquisition technique indicate that 85 is a good choice for DT.

For successful operation of the adaptive acquisition technique for maximal length sequences of u and v of G (u,v), at least one measured correlation test level must exceed $V_{LA}$ for every length DT of code phase searched until the primary correlation is tested. Therefore, $V_{LA}$ should be chosen so that it corresponds to a probability of false alarm greater than $\frac{1}{2}$DT. If the probability of false alarm corresponding to the actual lower threshold $V_{LA}$ is chosen to be 0.1, this leads to a normalized lower threshol $V_{LN}$ of 26.

The threshold margin, $TM = V_{UA} - V_{LA}$, is also a critical design parameter in the adaptive acquisition technique since the value of TM will determine the actual upper threshold $V_{UA}$. In particular, during code search, the phase between code correlation peaks and the tested correlation levels is unknown. In the steady-state prior to testing the primary correlation, it is required that $V_{UA}$ correspond to the highest spurious signal seen thus far. In this case, it is necessary that the measured correlation level X, corresponding to the worst case test position around a spurious correlation, have a high probability of exceeding $V_{LA}$. The threshold margin should thus be chosen to be at least greater than the difference in the best and worst case spurious correlation test measurements X that are to be sampled during the adaptive search. In the described example using a four level Gold code, the best test position around a spurious correlation is the peak of the autocorrelation sidelobe with a level of $-23.94$ dB. The worst case test position is a quarter-chip away with a sidelobe level of $-24.91$ dB (corresponding to a signal level of $-27.41$ dB). Accordingly, TM should be chosen to be greater than 3.47 dB. However, if TM is excessively large, then upon testing of the primary autocorrelation peak, the threshold $V_{LA}$ will not have been raised sufficiently, thereby allowing some spurious correlation (following the primary peak) to exceed $V_{LA}$ resulting in a false acquisition. Thus, TM should be chosen to be about 4 dB leading to a normalized upper threshol $V_{UN}$ of 65.3. $V_{LN}$ and $V_{UN}$ are then used to find initial values for $V_{LA}$ and $V_{UA}$ (by multiplying $V_{UN}$ and $V_{LN}$ by $2\sigma^2$), remembering that the actual threshold is related to the normal threshold by the expression $V_A = 2\sigma^2 V_N$.

Figure 6:
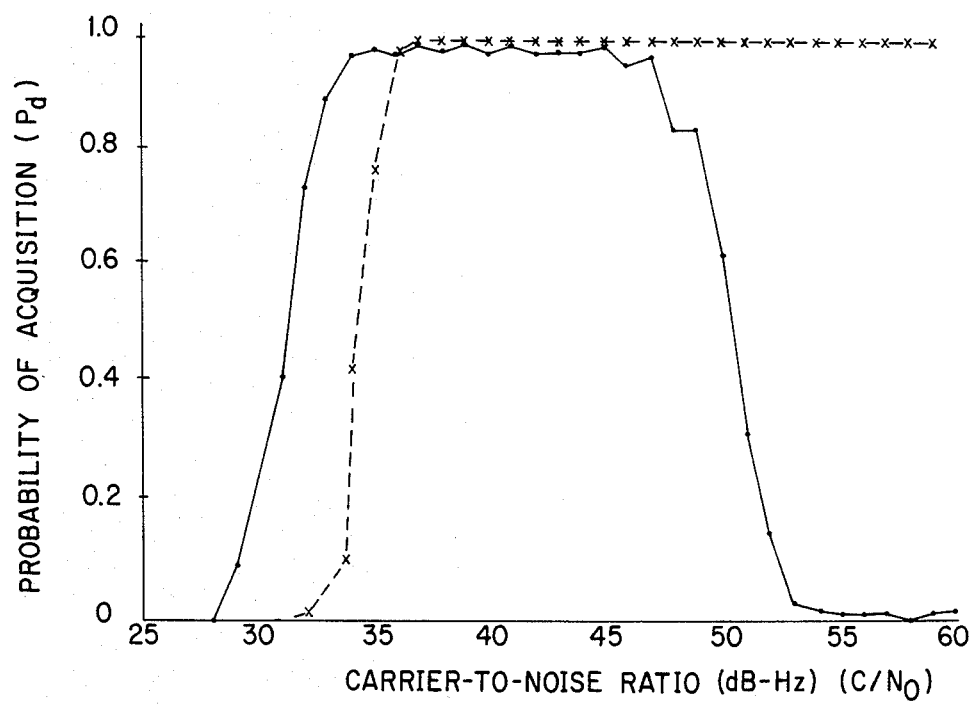
FIG. 6 is a schematic diagram showing the comparison between the performance of prior art acquisition techniques and the adaptive acquisition technique of the present invention.

Referring to FIG. 6, a Monte Carlo simulation, similar to that performed with respect to the single fixed threshold technique, was performed to study the performance of the adaptive acquisition techniuqe. The probability of acquisition was based on 100 acquisitions at each carrier-to-noise ratio using a family of Gold codes having four autocorrelation sidelobes. The parameters used in the simulation were DT=85, $V_{LN}=26$ and $V_{UN}=65.3$, as were developed above. The predetection time and the test time were the same as those used in the fixed threshold acquisition simulation. A code, with the sum of the spectra at 63 and −65 being minimum, corresponds to the worst case for adaptive acquisition and such a code was used for the Monte Carlo simulation. As shown by the dashed lines in FIG. 6, it can be seen that at high and extremely high carrier-to-noise signal levels, the acquisition adapts well and provides a high probability of acquisition (Pd). This is accomplished with only a small reduction (approximately 3 dB) in the probability of acquisition for low carrier-to-noise signal levels when compared with the fixed threshold technique. Thus, the present inventive technique improves high signal acquisition performance at substantially increased carrier-to-noise signal levels with only minimal degradation at low carrier-to-noise signal levels.

While the above technique was simulated and tested based on a set of Gold codes with four levels of autocorrelation function, the same technique may be used with other codes with more than four levels, noting that the proper selection of parameters must be made to take advantage of the selected most predominate sidelobes. The technique can be performed with only minimal experimentation with respect to those codes thereby enabling improved operation of the spread spectrum system at high carrier-to-noise signal levels. The described system and technique of dual adaptive thresholds provides improved acquisition in multiple access, spread spectrum, multiplexed systems, without significantly increasing acquisition times. The technique allows initial signal acquisition in a strong signal environment even in the presence of substantial crosscorrelation levels and strong autocorrelation sidelobes. These are all advantages not taught or shown by the prior art.

It is apparent that other circuits than those specifically described could be used to functionally accomplish the steps necessary to perform the adaptive threshold operation within the teachings of the disclosure. By way of example, the elements 18, 26, 28, 34, 40, 42, 43 and 44, shown within the dotted line 46, could be replaced with a microprocessor or other conventional digital computer capable of performing the reference code generating and selecting; correlation sampling; phase adjusting and storing; threshold setting, detecting and modifying; and signal demodulating. Such functions could be hardwired or programmed with known techniques to accomplish the mathematical manipulations and comparisons. Any other structure would also be suitable to accomplish the above functions.

Obviously, many other modifications and variations of the present invention are possible in light of the above teachings. It is therefore to be understood that within the scope of the appended claims, the invention may be practiced otherwise than as specifically described.

What is claimed is:
1. A signal measuring technique comprising:
providing first and second signals;
measuring the correlation between said first and second signals at different phases of one of said signals;
comparing said measured correlations to first and second threshold signals and providing an output when said measured correlation exceeds said first or second threshold signals;
modifying each threshold signal when a measured correlation exceeds said second threshold signal; and
adjusting the phase of said one of said signals to that phase corresponding to the most recent output.

2. The technique of claim 1 wherein said second threshold signal is greater than said first threshold signal by a predetermined amount and wherein said modifying step comprises increasing each threshold signal by an amount equal to the difference between the measured correlation and said second threshold signal.

3. The technique of claim 2 wherein said step of adjusting includes adjusting the phase of said one of said signals only after a predetermined time following said most recent output.

4. A technique for matching the phases of two signals comprising:
measuring the correlation between said signals at various points representing different signal phases;
comparing the measured correlation to first and second threshold signals;
adaptively increasing said first and second threshold signals each time a measured correlation exceeds said second threshold signal; and
providing an indication of phase match at the phase corresponding to the correlation point representing the most recent correlation which exceeds said first or second threshold signal.

5. The technique of claim 4 wherein said first and second signals are replicas of one another.

6. The technique of claim 4 wherein said second threshold signal has a magnitude greater than said first threshold signal by a predetermined amount.

7. The technique of claim 6 wherein said step of adaptively increasing includes increasing both threshold signals by the same amount.

8. The technique of claim 7 wherein said same amount is equal to the difference between said measured correlation and said second threshold signal.

9. The technique of claim 5 wherein said step of providing includes providing said indication only a predetermined time after said most recent correlation.

10. In a system for matching the phase of two similar signals based upon the measurement of correlation between the signals at various selected phases, wherein a measurement of maximum correlation represents matched phases, the improvement comprising:
means for providing adaptive first and second threshold signals such that when a measured correlation exceeds the first or second threshold signals a possible phase match is indicated and when a correlation exceeds the second threshold signal, both threshold signals are increased a predetermined amount; and
means for indicating phase match at that phase represented by the last measured correlation which exceeds said first or second threshold signal.

11. The system of claim 10 wherein the system is a spread spectrum system and the two signals are a coded received signal and a reference code signal of identical configuration and wherein said second threshold signal has a magnitude greater than said first threshold signal by a predetermined amount.

12. The system of claim 11 wherein the correlation measurements are made successively over a period of the code phase uncertainty and said predetermined amount by which said threshold signals are raised is equal to the amount by which the measured correlation at the selected phase exceeds said second threshold signal and further wherein said means for indicating only indicates a phase match a predetermined time after said last measured correlation.

13. The system of claim 12 wherein said signals produce a correlation function having a primary correlation peak when said signals are measured for correlation at phase match and having a plurality of autocorrelation sidelobes spaced about said primary correlation peak, each of which have a magnitude less than said primary correlation peak for correlation measurements made at phases other than phase match.

14. The system of claim 13 wherein said means for providing provides said first threshold signal at a magnitude so that if the primary correlation peak has not been measured as said last measured correlation, there is a high probability that an autocorrelation peak will be measured within a time period equal to said predetermined time period.

15. The system of claim 14 wherein said means for providing provides said second threshold signal at a magnitude greater than said first threshold signal so that upon measurement of correlation at said primary correlation peak, said first threshold signal will be increased by an amount such that any subsequently measured correlation at an autocorrelation sidelobe will not exceed said first threshold signal.

16. In a direct sequence spread spectrum communication system having a plurality of transmitters and receivers wherein each of said transmitters transmit a differently coded carrier for code division multiplexing, and each receiver generates a reference code which is a replica of the code received from a transmitter from which reception is desired for enabling multiple access reception, said receivers including correlation controlled phase matching structure for measuring the correlation between the received code and reference code at successive different code phases for determining a match of the code phases, the improvement in said correlation controlled phase matching structure comprising:

means for establishing a first threshold signal and a second threshold signal having a magnitude greater than said first threshold signal;

means for detecting when a measured correlation exceeds said first or second threshold signals;

means for increasing the magnitude of said first and second threshold signals when a measured correlation exceeds said second threshold signal;

means for providing an indication of code phase when said measured correlation exceeds said first or second threshold signals; and means for fixing the phase of the reference code at the phase represented by the most recent indication of code phase.

17. The system of claim 16 wherein said means for increasing increases the magnitude of said threshold signal prior to the correlation measurement at the next successive code phase and said means for fixing fixes said phase at the most recent indication only after a predetermined time subsequent to the most recent indication.

18. A technique for providing adaptive signal acquisition in a communication system comprising:
transmitting a coded signal;
receiving said transmitted signal;
generating a reference code which is a replica of the transmitted code;
changing the phase of the reference code at selected intervals;
measuring the correlation between the transmitted code and reference code during said selected intervals;
establishing a first threshold signal and a second threshold signal having a magnitude greater than said first threshold signal;
comparing each measured correlation with said first and second threshold signals during each selected interval;
increasing each threshold signal prior to the next selected interval when said measured correlation exceeds said second threshold signal, said threshold signals each being increased an amount equal to the difference between said measured correlation and said second threshold signal;
providing an indication of signal acquisition when said measured correlation exceeds said first or second threshold signal; and
fixing the phase of the reference code at the phase represented by the last provided indication when a predetermined time period has elapsed after said last indication.

* * * * *